(No Model.)
J. B. EDSON.
APPARATUS FOR TESTING PRESSURE GAGES.
No. 596,581. Patented Jan. 4, 1898.
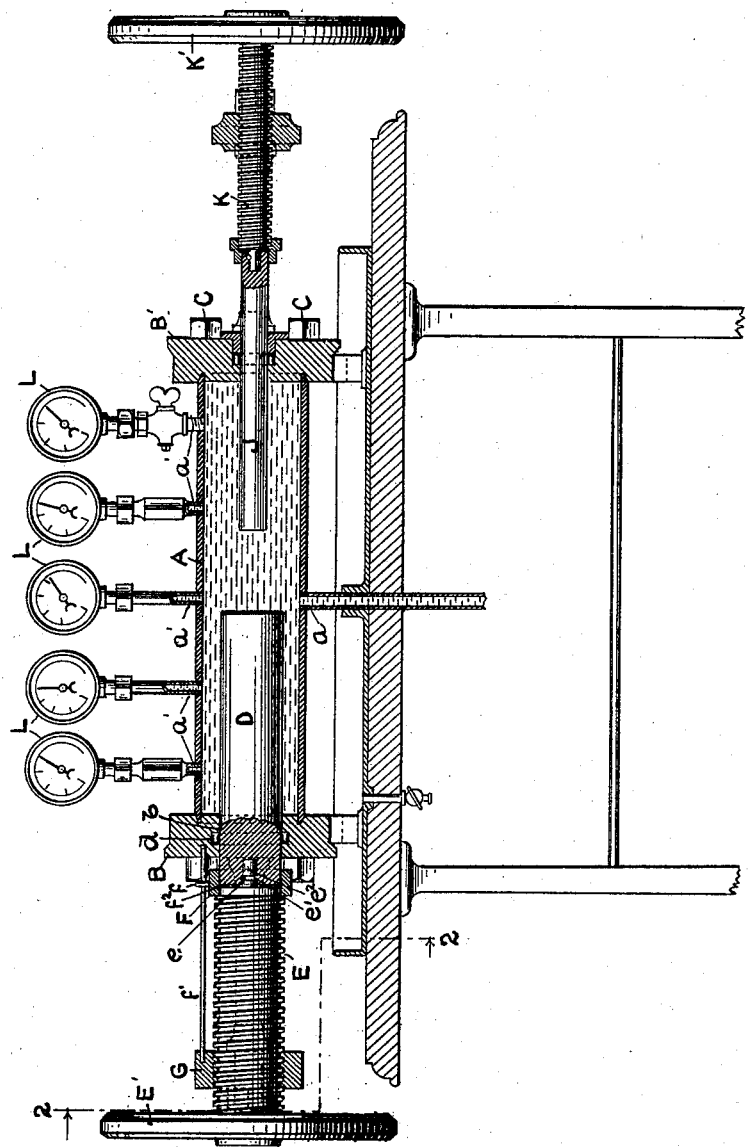
Witnesses
Chas. Hanimann
Edson Salisbury Jones
Jarvis B. Edson
Inventor
By his Attorney
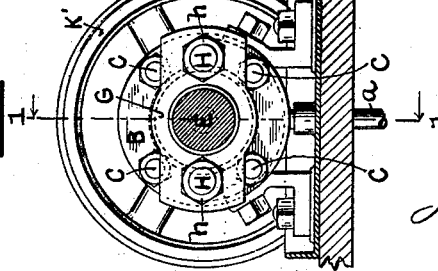

UNITED STATES PATENT OFFICE.

JARVIS B. EDSON, OF SHELTER ISLAND, NEW YORK, ASSIGNOR TO THE ASHCROFT MANUFACTURING COMPANY, OF BRIDGEPORT, CONNECTICUT.

APPARATUS FOR TESTING PRESSURE-GAGES.

SPECIFICATION forming part of Letters Patent No. 596,581, dated January 4, 1898.

Application filed July 29, 1896. Serial No. 600,995. (No model.)

*To all whom it may concern:*

Be it known that I, JARVIS B. EDSON, a citizen of the United States, residing in Shelter Island, in the county of Suffolk and State of New York, have invented a new and useful Improvement in Pressure-Producing Apparatus, of which the following is a specification.

The invention relates particularly to pressure-producing apparatus that is designed to be employed in the testing of pressure-gages and is used to force oil or other proper liquid into a receptacle or pot containing mercury, which receptacle is connected with a mercury column or tube, the cylinder of the apparatus being so constructed as to permit the temporary attachment thereto of one or more gages that are to be tested.

The improvement consists in certain features of construction and arrangement hereinafter described and claimed.

In the accompanying drawings, Figure 1 represents the improved apparatus in central longitudinal section on line 1 1 of Fig. 2 with the plungers in side elevation. Fig. 2 shows a view of one of the ends of the same with one of the screws in transverse section on line 2 2 of Fig. 1.

The apparatus is mounted on any suitable bed or frame, and consists of a hollow cylinder or tube A, the ends of which are tightly closed, as by heads B B', which are clamped upon said ends, as by longitudinal bolts C, extending from head to head, suitable packings being employed, if necessary, between the ends of the tube and the heads to prevent all possible leakage.

Through the head A a plunger D extends, which is closely fitted to a hole $b$ in the head and is surrounded by a suitable packing $d$ to prevent leakage. The outer end of this plunger is connected to a screw E, so as to follow the longitudinal movements of the latter and preferably so as not to be rotated by the same. As shown, the connection is made by a pin $e$, which passes through the plunger and through an annular groove $e'$ on a spur $e^2$, that projects from the screw and occupies a hole in the end of the plunger.

A collar F is secured to the plunger and surrounds the contiguous ends of the plunger and screw, so as to keep out dust, and from this collar a finger $f$ projects, which forks a stationary rod $f'$, extending from the head B. Preferably a suitable washer $f^2$ is placed between the ends of the plunger and screw to reduce friction between the two.

The screw E is threaded through a block G, which is supported on the head B by two posts H, secured to the head, and the block is clamped to these posts by nuts $h$. The screw is provided with a wheel E' or other suitable means for turning it.

Through the head B' a much smaller plunger J passes, which is connected with a screw K, having a wheel K' or other suitable means of turning it, this plunger and screw being mounted and connected in the same manner as are the plunger D and screw E.

The general outlet $a$ to the cylinder A is shown as a pipe which is intended to extend to the mercury-pot, (not shown,) and the cylinder is provided with one or more outlets, as pipes $a'$, to which the gages L to be tested can be attached.

The operation of the apparatus is as follows: The gage or gages to be tested being secured in position and in communication with the interior of the cylinder and both plungers being at the outward extremes of their strokes, (the plunger D being withdrawn to the left and the plunger J to the right of the positions shown in Fig. 1,) the screw E is turned and the plunger D thereby moved gradually into the cylinder. This inward movement of the plunger displaces some of the fluid in the cylinder and forces such fluid through the outlet $a$ into the mercury-pot, thereby forcing some of the mercury out of the pot into the column or tube (not shown) upon which the pressure is to be registered. When such a pressure is reached that it becomes difficult to turn the screw E, the screw K is turned to advance the plunger J, which is of much smaller diameter, and such plunger is advanced until the desired pressure is obtained in the mercury-tube.

The foregoing description of the operation of the apparatus explains its use for testing at high pressures, but there is considerable advantage to be obtained by the use of both plungers when comparatively low pressures are to be tested and especial accuracy is desired. In such a case the plunger D is advanced until the pressure wanted is approximated, when the plunger J is advanced to complete the pressure, which can be done with much more accuracy and with less waste of time than were one plunger alone employed.

The apparatus is simple in construction and admits of obtaining either high or low pressure with ease and great accuracy.

What I claim as my invention, and desire to secure by Letters Patent, is—

1. A pressure-producing apparatus comprising a closed chamber having outlets for connection with the instruments to be tested and an outlet for connection with a mercury-pot, pistons of different diameters extending into the chamber through its opposite heads and separate and independent operating-screws mounted in fixed nuts exterior to the opposite ends of the chamber and swiveled to the outer exposed ends of said pistons, substantially as described.

2. A pressure-producing apparatus comprising a closed chamber having outlets for connection with the instruments to be tested, a plunger extending into the chamber, an operating-screw mounted in a bearing-nut exterior to the chamber and having a swivel connection with the outer end of the plunger, a collar encircling the abutting ends of the screw and plunger and a guide-rod connecting said bearing-nut with the adjacent end of the chamber and with which the collar is in sliding connection, substantially as described.

JARVIS B. EDSON.

Witnesses:
F. GARRETT,
CHAS. W. FORBES.